United States Patent
Isshiki

(10) Patent No.: US 7,039,558 B2
(45) Date of Patent: May 2, 2006

(54) CHARGE PROCESS UPON EFFECTING PREDETERMINED PROCESS BY USING PLURAL DATA PROCESSING APPARATUS, AND DATA PROCESSING APPARATUS USED THEREFOR

(75) Inventor: Naohiro Isshiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 09/847,257

(22) Filed: May 2, 2001

(65) Prior Publication Data

US 2002/0013677 A1    Jan. 31, 2002

(30) Foreign Application Priority Data

May 10, 2000  (JP) ............................. 2000-137114
Mar. 29, 2001  (JP) ............................. 2001-094908

(51) Int. Cl.
    *G06F 15/00*    (2006.01)
(52) U.S. Cl. .................................................. 702/186
(58) Field of Classification Search ................ 702/186, 702/182; 705/52, 400, 38, 17, 16, 39, 18; 364/408; 379/45; 235/454, 380, 379; 355/41; 358/444, 1.6, 1.9, 1.18, 1, 474, 195, 1.15, 358/2, 447; 382/107, 251, 101, 239; 395/101; 710/5, 1; 709/205, 203, 223; 348/197; 715/513; 400/16, 70; 271/10; 399/395; 707/100, 707/1; 347/37; 345/204; 713/175, 169; 704/246; 340/509; 455/406, 557

See application file for complete search history.

(56) References Cited

U.S. PATENT DOCUMENTS

| | | | | |
|---|---|---|---|---|
| 4,516,264 | A * | 5/1985 | Corvari et al. | 382/101 |
| 5,010,485 | A * | 4/1991 | Bigari | 705/17 |
| 6,075,928 | A * | 6/2000 | Kitada et al. | 358/1.15 |
| 6,292,211 | B1 * | 9/2001 | Pena | 348/14.08 |
| 6,400,466 | B1 * | 6/2002 | Yamazaki et al. | 358/1.6 |
| 2001/0012112 | A1 * | 8/2001 | Aoyagi et al. | 358/1.9 |
| 2002/0073035 | A1 * | 6/2002 | Saito | 705/52 |
| 2002/0107817 | A1 * | 8/2002 | Nakajima | 705/400 |
| 2002/0114007 | A1 * | 8/2002 | Hayashi | 358/1.18 |

FOREIGN PATENT DOCUMENTS

JP    11-096118    * 4/1999

* cited by examiner

*Primary Examiner*—John Barlow
*Assistant Examiner*—Tung S. Lau

(74) *Attorney, Agent, or Firm*—Cowan, Liebowitz & Latman, P.C.

(57) ABSTRACT

When a process such as printing is effected by using a plurality of apparatuses connected to a network, a proper charge process can be performed so long as at least one of the apparatuses has a charge function. Presence/absence of the charge function is informed to an opponent apparatus, and, if the opponent apparats has the charge function, an apparatus itself does not effect the charge process.

6 Claims, 7 Drawing Sheets

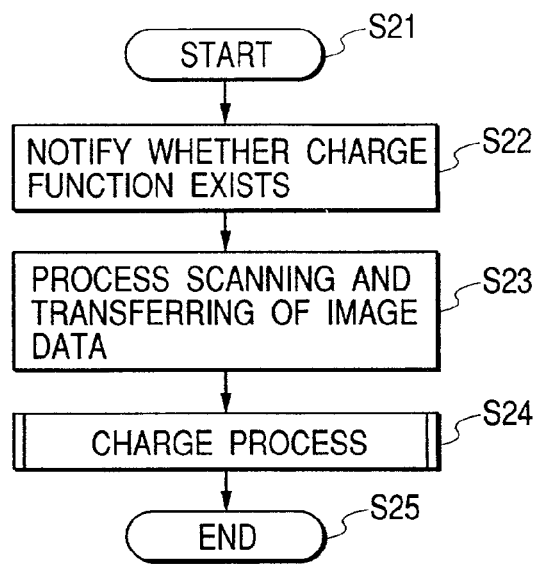
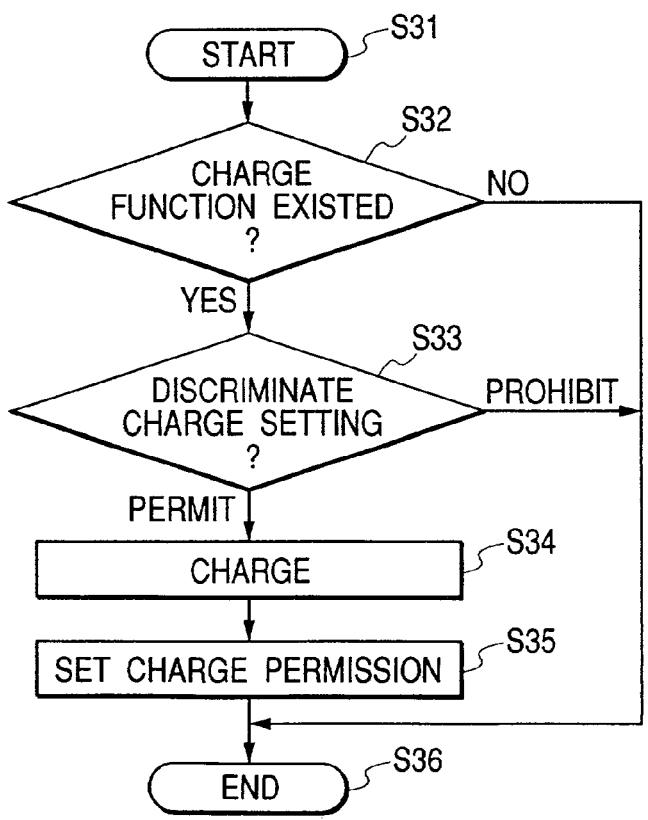

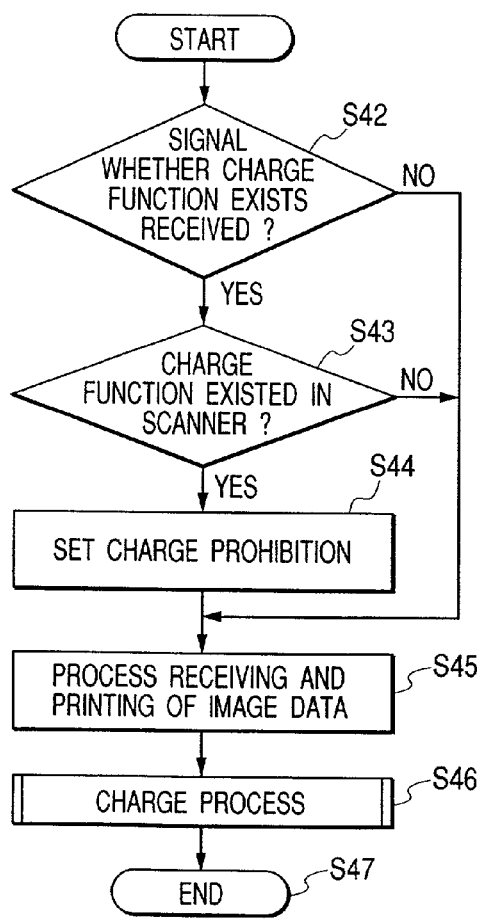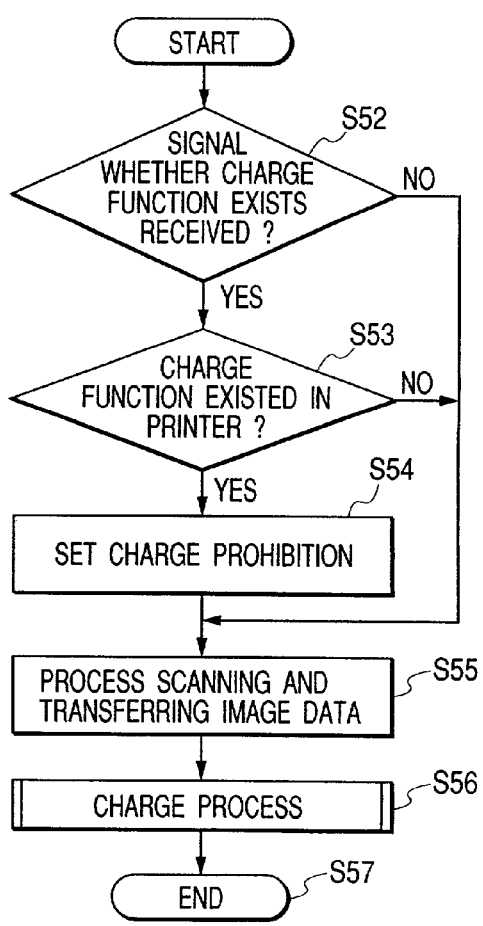

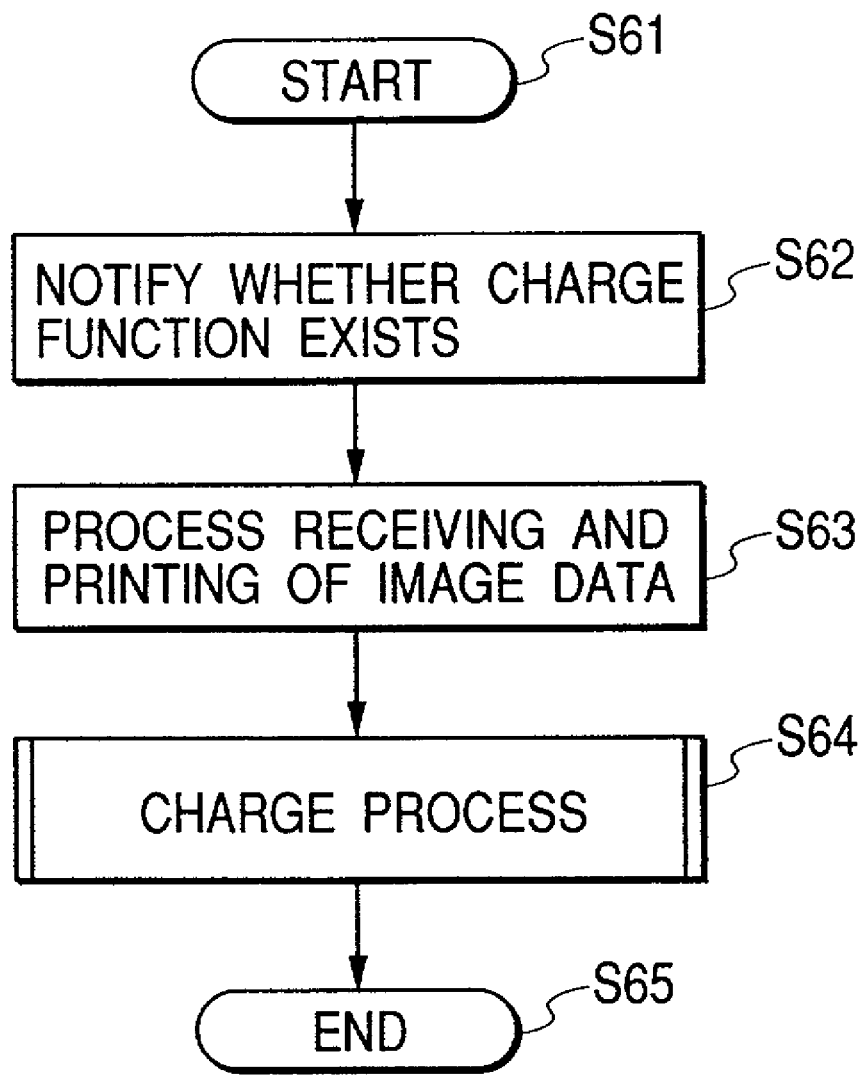

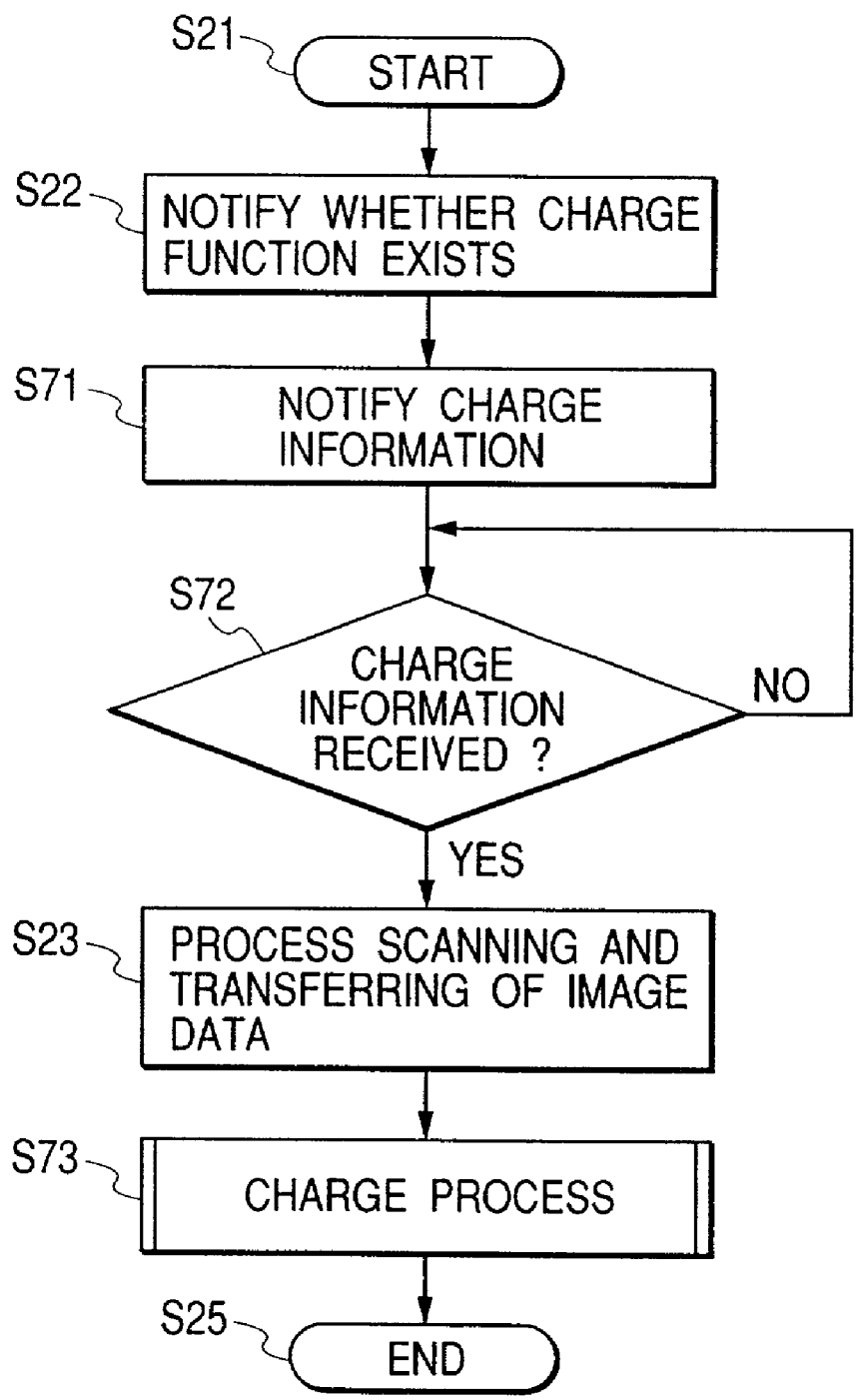

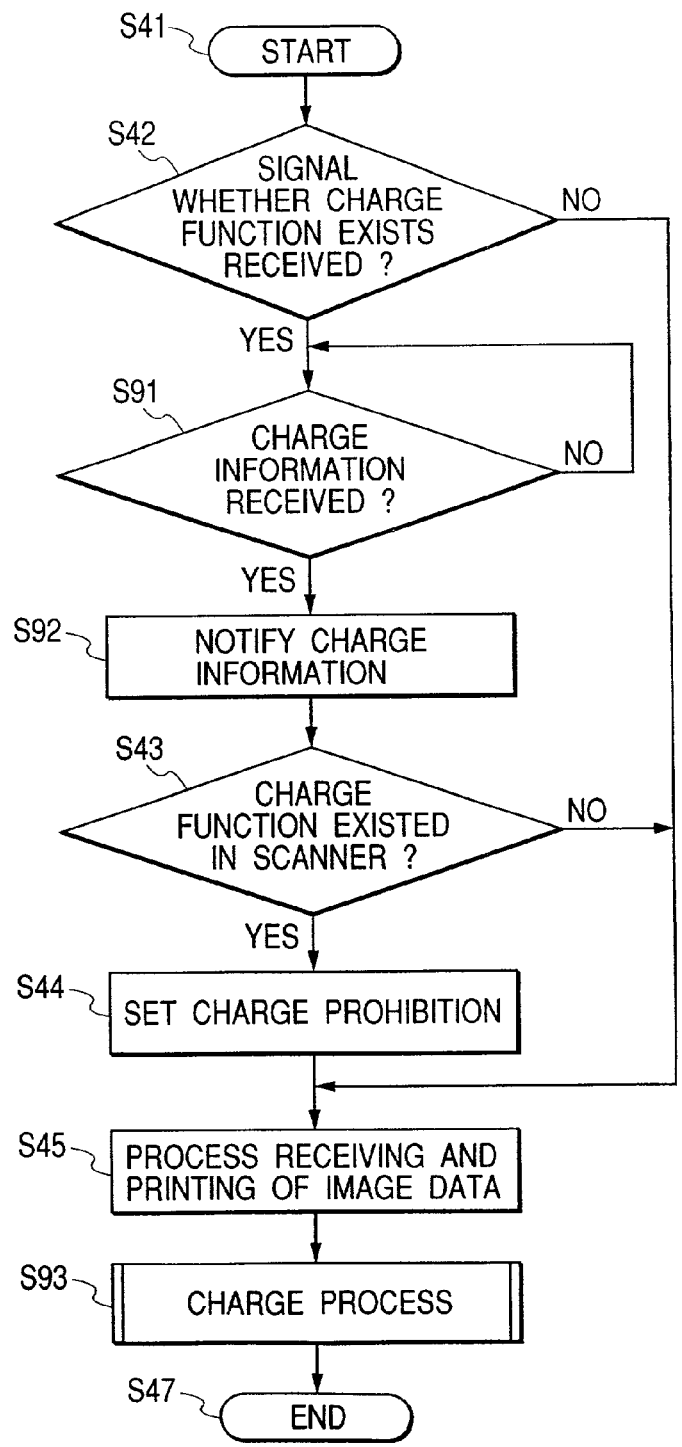

CHARGE PROCESS UPON EFFECTING PREDETERMINED PROCESS BY USING PLURAL DATA PROCESSING APPARATUS, AND DATA PROCESSING APPARATUS USED THEREFOR

BACKGROUND OF THE INVENTION

1. Field of the Invention

The present invention relates to a charge process upon effecting predetermined process by using a plurality of data processing apparatuses, and a data processing apparatus used therefor.

2. Related Background Art

In the past, there was a technique in which a scanning apparatus for scanning image data is connected to printing apparatuses for printing the image data through a network and, when the image data scanned by the scanning apparatus is printed by the designated printing apparatus, only such a printing apparatus effects charge for printing of the image data.

Accordingly, in the conventional technique, even when the scanning apparatus is provided with a charge function, if the printing apparatus which is not provided with a charge function is designated and the printing is effected by such printing apparatus, there arises a problem that the printing of the image data cannot be subjected to charge.

On the other hand, even when the scanning apparatus provided with the charge function can set the charge, if the printing apparatus which is provided with a charge function is designated and the printing is effected by such printing apparatus, there arises a problem that the charge is effected by both the scanning apparatus and the printing apparatus to cause double charge.

SUMMARY OF THE INVENTION

An object of the present invention is to permit proper charge, when process such as printing is effected by using a plurality of apparatuses connected to a network, so long as at least one of such apparatuses has a charge function.

Another object of the present invention is to prevent double charge or no charge when the process is effected by using a plurality of apparatuses.

The other objects and features of the present invention will be more apparent from the following detailed explanation of the invention referring to the accompanying drawings.

BRIEF DESCRIPTION OF THE DRAWINGS

FIG. 2 is a flow chart showing an operation of a scanner 200 when remote copy is effected in the first embodiment of the present invention;

FIG. 3 is a flow chart showing a charge process effected by a printer 100 and scanner 200 in the first to fifth embodiment;

FIG. 4 is a flow chart showing an operation of the printer 100 when remote copy is effected in the first embodiment;

FIG. 5 is a flow chart showing an operation of a scanner 200 when remote copy is effected in the third embodiment;

FIG. 6 is a flow chart showing an operation of the printer 100 when remote copy is effected in the third embodiment;

FIG. 7 is a flow chart showing an operation of a scanner 200 when remote copy is effected in the sixth embodiment;

FIG. 9 is a flow chart showing an operation of the printer 100 when remote copy is effected in the sixth embodiment.

DESCRIPTION OF THE PREFERRED EMBODIMENTS

First Embodiment

Figure 1:
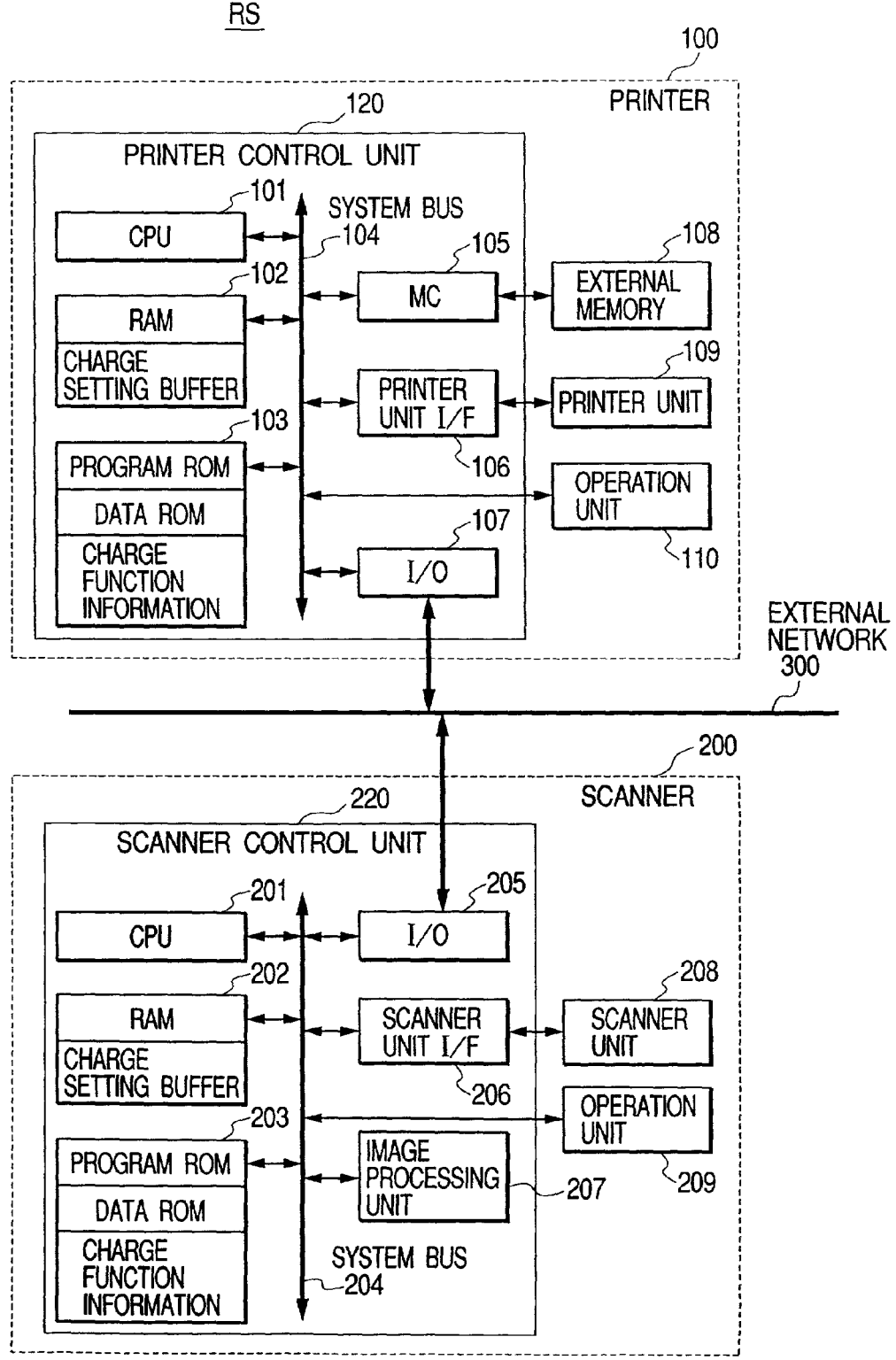
FIG. 1 is a block diagram of a remote copy system RS according to first to seventh embodiments of the present invention.

FIG. 1 is a block diagram of a remote copy system RS according to a first embodiment of the present invention.

The remote copy system RS is constructed so that a printing apparatus (printer) 100 is connected to a scanner 200 through an external network 300. Incidentally, FIG. 1 also shows constructions of the printer 100 and the scanner 200.

The printer 100 is, for example, a laser beam printer or an ink jet printer and serves to receive and store printing information supplied from the external network 300 and to form a character pattern corresponding to the printing information and form an image on a recording paper as a recording medium.

Further, the printer 100 includes an external memory 108, a printer unit 109, an operation panel 110 and a printer control unit 120. Incidentally, the operation panel 110 includes various switches for operation, and an LED display.

The printer control unit 120 serves to control the entire printer and to analyze character information supplied from an external device. The printer control unit 120 also serves to convert a character pattern corresponding to the character information into a video signal and to send the video signal to the printer unit 109.

Further, the printer control unit 120 includes a CPU 101, a RAM 102, a ROM 103, a memory control (MC) 105, a printer unit interface (I/F) 106, and an I/O 107 for inputting and outputting a signal, and the CPU 101—the I/O 107 are interconnected through a system bus 104.

The CPU 101 serves to totally control access to various devices connected to the system bus 104, on the basis of control program (for effecting process which will be described later) stored in a program ROM of the ROM 103 or control program stored in the external memory 108.

Further, the CPU 101 serves to output an image signal as output information to the printer unit 109 connected via the printer unit I/F 106 and cause the printer unit 109 to print the image signal. Incidentally, a data ROM of the ROM 103 stores charge function information for indicating whether the printer 100 is provided with a charge function or not.

Further, the CPU 101 can perform communication to the external device such as the scanner 200 through the I/O 107.

The RAM 102 is a RAM acting as a main memory/work area of the CPU 101. Further, the RAM 102 has a charge setting buffer for storing a signal for setting charge prohibition or charge permission. The memory controller 105 serves to control access to the external memory 108.

The scanner 200 is a scanning apparatus for reading an original image photo-electrically by means of an image sensor such as CCD and is connected to the external network 300 through an I/O 205.

Further, the scanner 200 includes a scanner unit 208, an operation unit 209 and scanner control unit 220. Incidentally, the operation unit or panel 209 includes various switches for operation, and an LED display.

The scanner control unit 220 serves to control the entire scanner 200. Further, the scanner control unit 220 also serves to receive image data scanned by the scanner unit 208 as a video signal and to send the image data after image-processed to the external network 300 via the I/O 205.

Further, the scanner control unit 220 includes a CU 201, a RAM 202, a ROM 203, the I/O 205, a scanner unit interface (I/F) 206 and an image processing unit 207, and the CPU 201—the image processing unit 207 are interconnected via a system bus 204.

The CPU 201 serves to totally control access to various devices connected to the system bus 204, on the basis of control program (for effecting process which will be described later) stored in a program ROM of the ROM 203 or control program stored in the RAM 202.

A data ROM of the ROM 203 stores charge function information for indicating whether the scanner 200 is provided with a charge function or not.

The RAM 202 is a RAM acting as a main memory/work area of the CPU 201. Further, the RAM 202 has a charge setting buffer for storing a signal for setting charge prohibition or charge permission.

The scanner unit I/F 206 receives image data scanned by the scanner unit 208. The image processing unit 207 serves to carry out at least one of image-processes such as data compression, resolution conversion, magnification/reduction, clipping and multi-value/binary conversion regarding the image data inputted through the scanner unit I/F 206. The image data image-processed in the image processing unit 207 is sent to the external network 300 through the I/O 205.

Next, charge control effected when the scanner 200 and the printer 100 perform remote copy in the remote copy system RS will be explained.

FIG. 2 is a flow chart showing an operation of the scanner 200 when the remote copy is effected.

First of all, the operator of the remote copy system RS manipulates the operation unit 209 of the scanner 200 to send instruction of remote copy to the printer 100. Incidentally, in place of the instruction from the operation unit 209, instruction from a host computer (not shown) existing on the network 300 or instruction from the operation unit 110 of the printer 100 may be used. Further, information regarding charge permission is written in the charge setting buffer of the RAM 202 of the scanner 200.

Then, the CPU 201 of the scanner 200 judges whether the scanner has the charge function or not on the basis of the charge function information included in the data ROM of the ROM 203 and informs the printer 100 of a judged result (step S22).

Then, the image is scanned by the scanner unit 208, and the scanned image data is image-processed in the image processing unit 207, and the image-processed image data is sent to the printer 100 (step S23).

Then, the CPU 201 of the scanner 200 performs the charge process (step S24).

Next, the charge process effected by the scanner 200 will be explained.

FIG. 3 is a flow chart showing the charge process effected by the printer 100 and the scanner 200.

When the charge process is performed by the scanner 200, the CPU 201 judges whether the scanner 200 has the charge function or not on the basis of the charge function information included in the ROM 203 (step S32).

If the scanner 200 does not have the charge function, the charge process is ended without effecting the charge (step S36); whereas, if the scanner 200 has the charge function, the scanner 200 judges whether the charge is performed or not on the basis of the information in the charge setting buffer of the RAM 202 (step S33).

Then, if the charge effected by the scanner 200 is prohibited (step S33), the charge process is ended without effecting the charge (step S36); whereas, if the charge effected by the scanner 200 is permitted (step S33), the charge is effected by using the charge function of the scanner (step S34).

Then, information regarding the charge permission is written in the charge setting buffer of the RAM 202 of the scanner 200, and the program is ended (steps S35 and S36).

FIG. 4 is a flow chart showing the operation of the printer 100 when the remote copy is effected.

The printer 100 receives the remote copy print instruction from the scanner 200 or host computer or operation unit 110 through the external network 300. Incidentally, the information regarding the charge permission was already written in the charge setting buffer of the RAM 102 of the printer 100.

Then, the CPU of the printer 100 judges whether a signal representing presence/absence of the charge function is sent from the scanner 200 or not (step S42). When the signal representing presence/absence of the charge function is received, it is judged whether the scanner 200 has the charge function or not on the basis of the received signal (step S43).

If the scanner 200 has the charge function (step S43), the information representing the charge prohibition is written in the charge setting buffer of the RAM 102 (step S44) and then, the printer receives the image data sent from the scanner 200 and the received image data is printed in the printer unit 109 (step S45).

On the other hand, if the scanner 200 does not have the charge function (step S43), the printer receives the image data sent from the scanner 200 and the received image data is printed in the printer unit 109 (step S45). Also when the signal representing presence/absence of the charge function is not sent from the scanner 200, it is judged that the scanner 200 does not have the charge function.

Then, the CPU 101 of the printer 100 performs the charge process (step S46).

Next, the charge process in the printer 100 will be explained with reference to FIG. 3.

When the charge process is effected by the printer 100, the CPU 101 judges whether the printer 100 has the charge function or not on the basis of the charge function information included in the ROM 103 (step S32).

If the printer 100 does not have the charge function, the charge process is ended without effecting the charge (step S36); whereas, if the printer 100 has the charge function, it is judged whether the charge is effected by the printer 100 or not on the basis of the information in the charge setting buffer of the RAM 102 (step S33).

If the charge effected by the printer 100 is prohibited (step S33), the charge process is ended without effecting the charge (step S36); whereas, if the charge effecting by the printer 100 is permitted (step S33), the charge is effected by using the charge function of the printer 100 (step S34).

Then, the information regarding the charge permission is written in the charge setting buffer of the RAM 102 of the printer 100 and the program is ended (steps S35 and S36).

According to the first embodiment, in the scanner 200 and the printer 100 connected to the network, when the image data picked by the scanner 200 is printed by the designated printer 100 and the printing is subjected to the charge, so long as at least one of the printer 100 and the scanner 200 has the charge function, the charge can be effected. Further, when the scanner 200 has the charge function, since the charge is effected by using the charge function of the scanner preferentially, the charge can be effected positively.

That is to say, when the scanner 200 has the charge function and the printer 100 does not have the charge function, the charge can be effected by the scanner 200. On the other hand, when the scanner 200 has the charge function and the printer 100 also has the charge function, the charge is effected by the scanner 200 and the charge of the printer 100 is prohibited, with the result that since the charge is not effected by the printer 100, double charge can be prevented. Further, when the scanner 200 does not have the charge function and the printer 100 has the charge function, the charge can be effected by the printer 100.

Second Embodiment

A second embodiment of the present invention is an example that the step S23 is performed before the step S22 in the first embodiment. That is to say, after the scanner 200 transfers the image data (step S23), the scanner informs the presence/absence of the charge ability (step S22).

In this case, before the scanner 200 judges whether the signal representing the presence/absence of the charge function is received or not (step S32), the printer 100 receives the image data and effect the printing process (step S35).

Third Embodiment

FIG. 5 is a flow chart showing the operation of the scanner 200 when remote copy is effected in a third embodiment of the present invention. Incidentally, also in this embodiment, constructions of the network and the system are the same as those in the first embodiment.

First of all, the operator of the remote copy system RS manipulates the operation unit 209 of the scanner 200 to send instruction of remote copy to the printer 100. Incidentally, in place of the instruction from the operation unit 209, instruction from a host computer (not shown) existing on the network 300 or instruction from the operation unit 110 of the printer 100 may be used. Further, information regarding charge permission is written in the charge setting buffer of the RAM 202 of the scanner 200.

Then, the CPU 201 of the scanner 200 judges whether a signal representing presence/absence of the charge function is sent from the printer 100 or not (step S52). When the signal representing presence/absence of the charge function is received, it is judged whether the printer 100 has the charge function or not on the basis of the received signal (step S53).

If the printer 100 has the charge function (step S53), the information representing the charge prohibition is written in the charge setting buffer of the RAM 202 (step S54) and then, the image is scanned in the scanner unit 208, and, after the scanned image data is subjected to the image processing in the image processing unit 207, the image-processed image data is sent to the printer 100 (step S55).

On the other hand, if the printer 100 does not have the charge function (step S53), the image is scanned in the scanner unit 208, and, after the scanned image data is subjected to the image processing in the image processing unit 207, the image-processed image data is sent to the printer 100 (step S55). Also when the signal representing presence/absence of the charge function is not sent from the printer 100, it is judged that the scanner 200 does not have the charge function.

Then, the CPU 201 of the scanner 200 performs the charge process shown in FIG. 3 (step S56).

Next, the charge process effected by the scanner 200 will be explained with reference to FIG. 3.

When the charge process is performed by the scanner 200, the CPU 201 judges whether the scanner 200 has the charge function or not on the basis of the charge function information included in the ROM 203 (step S32).

If the scanner 200 does not have the charge function, the charge process is ended without effecting the charge (step S36); whereas, if the scanner 200 has the charge function, the scanner 200 judges whether the charge is performed or not on the basis of the information in the charge setting buffer of the RAM 202 (step S33).

If the charge effected by the scanner 200 is prohibited (step S33), the charge process is ended without effecting the charge (step S36); whereas, if the charge effected by the scanner 200 is permitted (step S33), the charge is effected by using the charge function of the scanner 200 (step S34).

Then, information regarding the charge permission is written in the charge setting buffer of the RAM 202 of the scanner 200, and the program is ended (steps S35 and S36).

FIG. 6 is a flow chart showing the operation of the printer 100 when the remote copy is effected in the third embodiment.

The printer 100 receives the remote copy print instruction from the scanner 200 or host computer or operation unit 110 through the external network 300. Incidentally, the information regarding the charge permission was already written in the charge setting buffer of the RAM 102 of the printer 100.

Then, the CPU 101 of the printer 100 judges whether the printer 100 has the charge function or not on the basis of the charge function information included in the data ROM of the ROM 103 and informs the scanner 200 of a judged result (step S62).

Then, the image data sent from the scanner 200 is received, and the received image data is printer in the printer unit 109 (step S63).

Then, the CPU 101 of the printer 100 performs the charge process shown in FIG. 3 (step S64).

Next, the charge process in the printer 100 will be explained with reference to FIG. 3.

When the charge process is effected by the printer 100, the CPU 101 judges whether the printer 100 has the charge function or not on the basis of the charge function information included in the ROM 103 (step S32).

If the printer 100 does not have the charge function, the charge process is ended without effecting the charge (step S36); whereas, if the printer 100 has the charge function, it is judged whether the charge is effected by the printer 100 or not on the basis of the information in the charge setting buffer of the RAM 102 (step S33).

If the charge effected by the printer 100 is prohibited (step S33), the charge process is ended without effecting the charge (step S36); whereas, if the charge effected by the printer 100 is permitted (step S33), the charge is effected by using the charge function of the printer 100 (step S34).

Then, the information regarding the charge permission is written in the charge setting buffer of the RAM 102 of the printer 100 and the program is ended (steps S35 and S36).

According to the third embodiment, in the scanner 200 and the printer 100 connected to the network, when the image data picked by the scanner 200 is printed by the designated printer 100 and the printing is subjected to the charge, so long as at least one of the printer 100 and the scanner 200 has the charge function, the charge can be effected.

That is to say, when the printer 100 has the charge function and the scanner 200 does not have the charge function, the charge can be effected by the printer 100. On the other hand, when the printer 100 has the charge function and the scanner 200 also has the charge function, the charge is effected by the printer 100 and the charge of the scanner 200 is. prohibited, with the result since that the charge is not effected by the scanner 200, double charge can be prevented. Further, when the printer 100 does not have the charge function and the scanner 200 has the charge function, the charge can be effected by the scanner 200.

Fourth Embodiment

A fourth embodiment of the present invention is an example that the step S55 is performed before the step S52 in the third embodiment. That is to say, after the scanner 200 transfers the image data (step S55), the scanner judges whether there is presence or absence of the charge ability of the printer 100. Namely, before it is judged whether the signal representing the presence/absence of the charge function is sent from the printer 100 (step S52), the image is scanned in the scanner unit 208, and the scanned image data is subjected to the image processing in the image processing unit 207, and the image-processed image data is sent to the printer 100 (step S55).

In this case, before it is judged whether the printer 100 has the charge function or not on the basis of the charge function information included in the data ROM of the ROM 103 and informs the scanner 200 of a judged result (step S62), the printer 100 receives the image data sent from the scanner 200, and the received image data is printed in the printer unit 109 (step S63).

Fifth Embodiment

In the first to fourth embodiments, while an example that the charge function information is stored in the ROMs of the printer 100 and the scanner 200 was explained, in a fifth embodiment of the present invention, the charge function information is stored in the RAMs. That is to say, in the system rising-up of the printer 100 and the scanner 200, the presence/absence of the charge function is checked, and charge function information representing the checked presence/absence of the charge function may be stored in the RAM.

Sixth Embodiment

A system arrangement used in a sixth embodiment of the present invention is similar to the system arrangements (FIG. 1) of the first to fifth embodiments.

FIG. 7 is a flow chart showing an operation of the scanner 200 when remote copy is effected in the sixth embodiment. Incidentally, in FIG. 7, the processes designated by the same reference numerals in FIG. 2 are the same process in FIG. 2.

In FIG. 7, similar to FIG. 2, when the operator of the remote copy system RS instructs or designates the remote copy, the CPU 201 of the scanner 200 judges whether the scanner 200 has the charge function or not on the basis of the charge function information included in the data ROM of the RAM 203 and informs the printer 100 of a judged result (step S22).

Then, the printer 100 is informed of the number of scans to be effected by the scanner 200 in the remote copy (step S71). Incidentally, the number of scans effected by the scanner 200 may be the counted number of set original sheets or the number of sheets designated by the operator.

After the information in the step S71, waiting is effected until the charge information from the printer 100 is informed, and information for effecting monochromatic printing or color printing is received as the charge information from the printer 100 (step S72), and the original is scanned in accordance with the charge information from the printer 100 (the original is scanned in a monochromatic mode when the informed charge information is monochromatic print and is scanned in a color mode when the charge information is color print), and the scanned image data is subjected to the image processing in the image processing unit 207, and, when, the image-processed image data is sent to the printer 100 (step S23).

Figure 8:
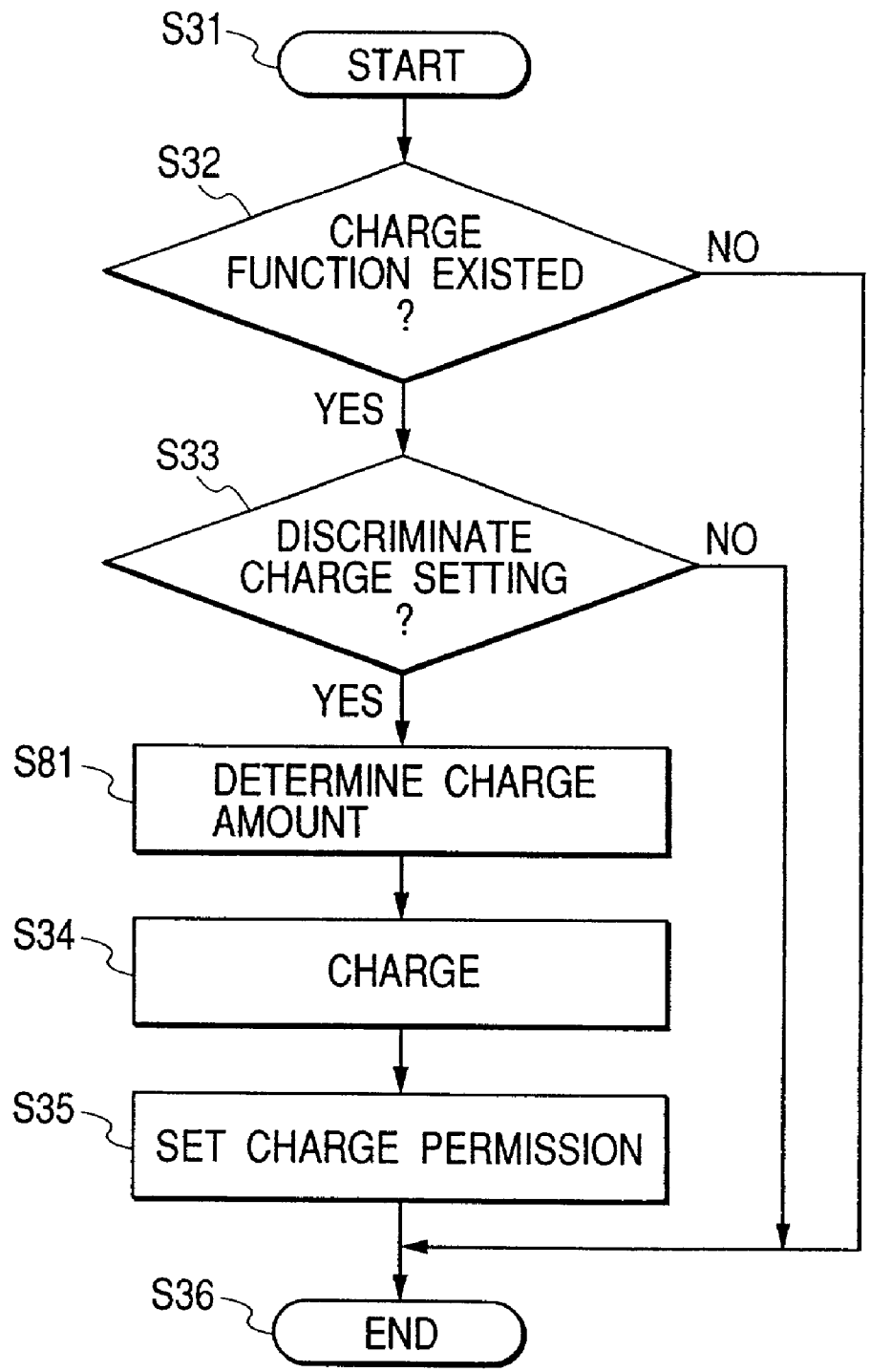
FIG. 8 is a flow chart showing a charge process effected by a printer 100 and scanner 200 in the sixth to fifth embodiments.

Then, the CPU 201 of the scanner 200 effects the charge process shown in FIG. 8 (step S73).

Next, the charge process effected by the scanner 200 will be explained with reference to FIG. 8. Incidentally, in FIG. 8, the processes designated by the same reference numerals as those in FIG. 3 are the same processes as those in FIG. 3.

In FIG. 8, similar to FIG. 3, when the scanner 200 does not have the charge function or when the charge is prohibited (steps S32 and S33), the process is ended without effecting the charge.

When the charge function is provided and when the charge is permitted, it is judged whether the monochromatic printing or the color printing is effected on the basis of the scanned number of original sheets, monochromatic scan or color scan and the charge information informed from the printer 100, and the charge amount is determined. More specifically, when it is assumed that the scanned number is N and the printed number M, the charge amount is determined by the following equation:

N×unit cost of scan (which is difference between monochromatic scan and color scan)+M×unit cost of print output (which is difference between monochromatic scan and color scan)

And, the charge process is effected with the determined charge amount (step S34), and the information regarding the charge permission is written in the charge setting buffer of the RAM 202 of the scanner 200, and the program is ended (steps S35 and S36).

FIG. 9 is a flow chart showing the operation of the printer 100 when the remote copy is effected in this embodiment. Incidentally, in FIG. 9, the processes designated by the same reference numerals as those in FIG. 4 are the same processes as those in FIG. 4.

In FIG. 9, when the printer 100 receives the remote copy instruction, it is judged whether the signal representing the presence/absence of the charge function is sent from the scanner 200 or not (step S42). When the signal representing the presence/absence of the charge function is received, it is waiting until the charge information is informed from the scanner 200 (step S91). When the charge information is received from the scanner 200, information whether the remote copy print is effected in the monochromatic mode or in the color mode is informed to the scanner 200 as the charge information of the printer 100 (step S92). When such information is finished, on the basis of the signal received in the step S42, it is judged whether the scanner 200 has the charge function or not (step S43).

If the scanner 200 has the charge function, the information regarding the charge prohibition is written in the charge setting buffer of the RAM 102 (step S44), and the image data sent from the scanner 200 is received, and the image data is printed in the printer unit 109 (step S45).

Further, if the scanner 200 does not have the charge function, the image data sent from the scanner 200 is received, and the image data is printed in the printer unit 109 (step S45).

When the printing is finished, the printer 100 effects the charge process shown in FIG. 8 (step S93).

Next, the charge process effected by the printer 100 will be explained with reference to FIG. 8. Incidentally, in FIG. 8, the processes designated by the same reference numerals as those in FIG. 3 are the same processes as those in FIG. 3.

In FIG. 8, similar to FIG. 3, when the printer 100 does not have the charge function or when the charge is prohibited (steps S32 and S33), the process is ended without effecting the charge.

When printing 100 has the charge function and when the charge is permitted, it is judged whether the monochromatic printing or the color printing is effected on the basis of the number of original sheets scanned by the scanner 200, monochromatic scan or color scan, and the charge amount is determined. More specifically, when it is assumed that the scanned number is N and the printed number M, the charge amount is determined by the following equation:

N×unit cost of scan (which is difference between monochromatic scan and color scan)+M×unit cost of print output (which is difference between monochromatic scan and color scan)

And, the charge process is effected with the determined charge amount (step S34), and the information regarding the charge permission is written in the charge setting buffer of the RAM 102 of the printer 100, and the program is ended (steps S35 and S36).

According to this embodiment, the charge amount can be determined by using the charge informations of the printer and the scanner (informations regarding the scanned number, monochromatic scan, color scan, printed number, monochromatic print and color print).

Seventh Embodiment

In the sixth embodiment, while an example that the charge information informed from the printer 100 includes the fact that the remote copy is effected with the monochromatic print or the color print was explained, the concrete charge amount may be informed. In this case, the scanner 200 determines the amount included in the charge information informed from the printer 100 and the final charge amount by using the information of the scanner itself.

Further, while an example that the charge information informed from the scanner 200 includes the scan number effected in the remote copy was explained, the concrete amount may be informed. In this case, the printer 100 determines the amount included in the charge information informed from the scanner 200 and the final charge amount by using the information of the printer itself.

Incidentally, in the above-mentioned embodiments, while an example that the remote print is effected in the scanner and the printer was explained, the present invention can be applied to processes between a facsimile apparatus, computer and server.

According to the present invention, when the process is effected by using the plural apparatuses, the proper charge process can be achieved. For example, the double charge and no charge can be prevented.

What is claimed is:

1. A data processing apparatus for effecting a predetermined process with respect to another data processing apparatus, comprising:
   a recognition unit for recognizing a money account function of another data processing apparatus;
   a decision unit for deciding that said data processing apparatus is to effect a money account process for a first process by said data processing apparatus and for a second process by said another data processing apparatus, in the case where said recognition unit recognizes that said another data processing apparatus does not have the money account function; and
   a control unit for controlling execution of the money account process in accordance with the decision by said decision unit,
   wherein the predetermined process is a process for printing an image read by said another data processing apparatus in the data processing apparatus, and the money account process is based on at least one part of information regarding the number of images read by said another data processing apparatus, monochromatic reading, color reading, the number of sheets to be printed by said another data processing apparatus, monochromatic printing and color printing.

2. A data processing apparatus according to claim 1, wherein said decision unit effects the decision on a basis of information received from another data processing apparatus.

3. A data processing apparatus for effecting a predetermined process with respect to another data processing apparatus, comprising:
   a recognition unit for recognizing a money account function of another data processing apparatus;
   a decision unit for deciding that said data processing apparatus is to effect a money account process for a first process by said data processing apparatus and for a second process by said another data processing apparatus, in the case where said recognition unit recognizes that said another data processing apparatus does not have the money account function; and
   a control unit for controlling execution of the money account process in accordance with the decision by said decision unit,
   wherein the predetermined process is a process for printing an image read by the data processing apparatus in said another data processing apparatus and the money account process is based on at least one part of information regarding the number of images read by the data processing apparatus, monochromatic reading, color reading, the number of sheets to be printed by said another data processing apparatus, monochromatic printing and color printing.

4. A method for controlling a data processing apparatus for effecting a predetermined process with respect to another data processing apparatus, comprising:
   recognizing a money account function of the another data processing apparatus;
   deciding that said data processing apparatus is to effect a money account process for a first process by said data processing apparatus and for a second process by said another data processing apparatus, in the case where said recognition step recognizes that said another data processing apparatus does not have the money account function; and
   controlling execution of the money account process in accordance with the decision in said deciding step, wherein the predetermined process is a process for printing an image read by said another data processing apparatus in the data processing apparatus, and the money account process is based on at least one part of information regarding the number of images read by said another data processing apparatus, monochromatic reading, color reading, the number of sheets to be printed by said another data processing apparatus, monochromatic printing and color printing.

5. A method for controlling a data processing apparatus comprising:

effecting a predetermined process with respect to another data processing apparatus;

informing said another data processing apparatus that the data processing apparatus has the money account function, so that said another data processing apparatus does not execute the money account process for the predetermined process; and executing the money account process for a first process by said data processing apparatus and for a second process by said another data processing apparatus in order to execute the predetermined process after informing in said informing step, wherein the predetermined process is a process for printing an image read by the data processing apparatus in said another data processing apparatus, and the money account process is based on at least one part of information regarding the number of images read by the data processing apparatus, monochromatic reading, color reading, the number of sheets to be printed by said another data processing apparatus, monochromatic printing and color printing.

6. A data processing method according to claim 4, wherein said decision step effects the decision on a basis of information received from another data processing apparatus.

* * * * *